United States Patent

Moore

[11] 3,897,394
[45] July 29, 1975

[54] POLYBISPHENOLS

[75] Inventor: William Ross Moore, Lake Jackson, Tex.

[73] Assignee: The Dow Chemical Company, Midland, Mich.

[22] Filed: July 1, 1974

[21] Appl. No.: 484,644

Related U.S. Application Data

[63] Continuation-in-part of Ser. No. 399,781, Sept. 21, 1973.

[52] U.S. Cl. ......... 260/47 R; 260/340.3; 260/613 R
[51] Int. Cl. ............................................. C08g 23/00
[58] Field of Search ........... 260/47 R, 613 R, 340.3

Primary Examiner—Melvin Goldstein
Attorney, Agent, or Firm—Benjamin G. Colley

[57] ABSTRACT

Polybisphenols having recurring units of the structure

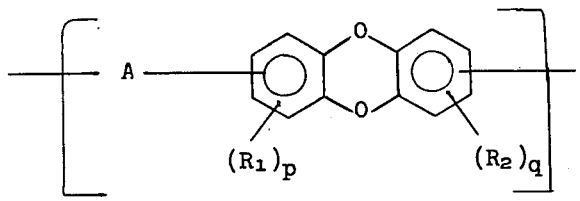

wherein A is a divalent hydrocarbon group of 1–13 carbons, $R_1$ and $R_2$ are independently selected from hydrogen, halogen, alkoxy, or alkyl groups wherein the alkoxy or alkyl groups have 1–3 carbon atoms and the sum of $p$ and $q$ is 0–4.

10 Claims, No Drawings

POLYBISPHENOLS

CROSS REFERENCE TO RELATED APPLICATIONS

This application is a continuation-in-part of Ser. No. 399,781 filed Sept. 21, 1973, now abandoned.

BACKGROUND OF THE INVENTION

The present invention relates to thermoplastic polybisphenols prepared by the oxidative coupling of bisphenols with an oxygen containing gas in the presence of cuprous salts and tertiary amines.

It is well known in the prior art that monophenols can be oxidatively coupled with oxygen to prepare polyphenylene ethers.

It is further known from U.S. Pat. No. 3,133,899 that thiobisphenols can be oxidatively coupled with the elimination of sulfur to produce polyphenylene ethers.

SUMMARY OF THE INVENTION

It now has been discovered that polybisphenols having recurring units of the structure

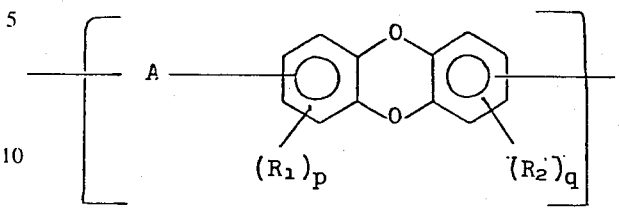

wherein A is a divalent hydrocarbon group of 1–13 carbons, $R_1$ and $R_2$ are independently selected from hydrogen, halogen, alkoxy, alkyl or aryl groups, $p$ and $q$ are 0 or 2 and the sum of $p$ and $q$ is 0–4, can be prepared by oxidatively coupling bisphenols with an oxygen containing gas.

More specific aspects of the invention are polybisphenols having the structures

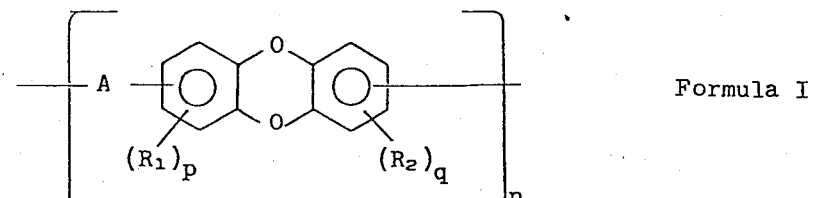

Formula I

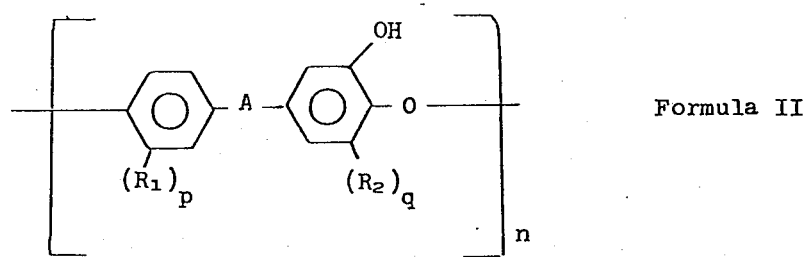

Formula II

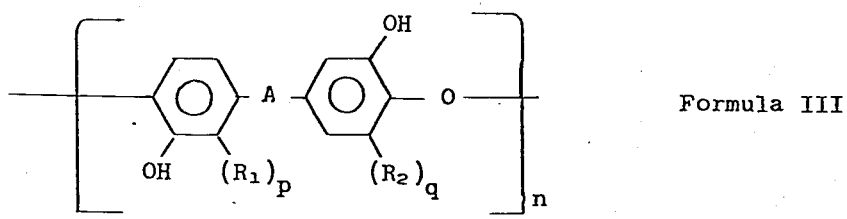

Formula III

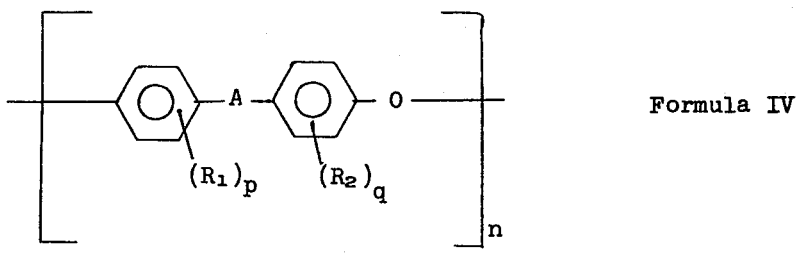

Formula IV

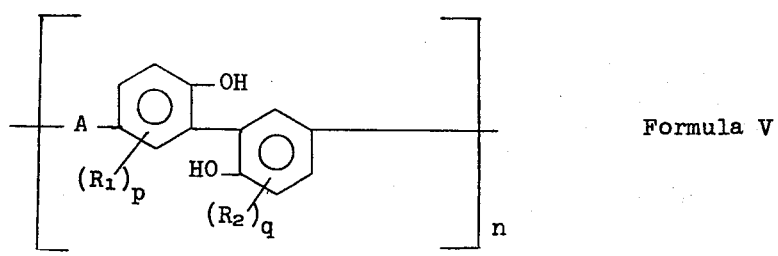

Formula V wherein A is a divalent hydrocarbon group of 1–13 carbons, $R_1$ and $R_2$ are independently selected from hydrogen, halogen, alkoxy, or alkyl groups wherein the alkoxy or alkyl groups have 1–3 carbon atoms and the sum of $p$ and $q$ is 0–4, and $n$ has a range from 2–200.

Thus, the present invention discloses oligomers ($n = 2$–6) and polymers ($n = 7$–200) having the above repeating units.

The polybisphenols thus prepared can be generally classified as oligomers and polymers, depending upon the degree of polymerization as hereinafter set forth. The oligomers are useful resin intermediates in that they contain phenolic hydroxyl end groups and can be used as chain extenders for polycarbonates, polyepoxides, polyesters and the like. The polymers of this invention are useful as heat resistant coatings for wire, coils and other electrical components. They can also be used to form fibers from which acid resistant filter media can be prepared.

DESCRIPTION OF THE INVENTION

The general process for preparing the polybisphenols of this invention is as follows:

A cuprous salt-tertiary amine solution or slurry is sparged briefly with inert gas to remove and/or keep oxygen or other contaminants out of the system. A solution of a bisphenol dissolved in either amine or an inert solvent or diluent is added to the cuprous solution with vigorous stirring. The inert gas is turned off. The temperature is adjusted and controlled as desired and then oxygen (or an oxygen containing gas) is rapidly added to the system. The vessel contents are reacted as long as desired at a controlled temperature in the range from about −30° to about 300°C. The vessel contents are then rapidly added to an aqueous mineral acid or other acidic neutralizing agent which inactivates the catalyst. The product is then separated from the aqueous phase by conventional methods such as filtration, or centrifugation. After a thorough washing step to remove the last traces of solvent, catalyst and acid, the product is dried.

In general, when carrying out the process, the tertiary amine is used in an amount such that the mol ratio based on the bisphenol is in the range from about 0.5:1 to about 50:1. The cuprous salt/bisphenol mol ratio is in the range from about 0.1:1 to about 1.0:1. Oxygen is used in a mol range of about 0.1:1 to about 50:1.

When it is desired to make oligomers, the time of reaction and temperature limitations are from about 1 second to 3 hours and preferably about 1 to 2 hours at a temperature range from about −30° to about 70°C. and preferably 25°–70°C. For polymers, the ranges are about 1 second to about 48 hours, preferably 4–5 hours at a temperature range from about 71° to about 300°C., preferably 100°–200°C.

The pressure used during the reaction can vary from subatmospheric to superatmospheric, i.e., from about 28 inches of Hg to about 300 psig but preferably the range is from about 0 to about 10 psig.

The bisphenols used in this invention are those having the general structure

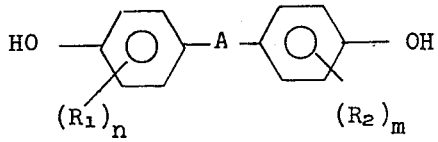

wherein A is a divalent hydrocarbon group of 1–13 carbons and $R_1$ and $R_2$ are independently selected from hydrogen, halogen, alkoxy, or alkyl groups having 1–3 carbon atoms in the alkoxy or alkyl groups wherein one or two of the positions ortho to the hydroxy group are substituted by hydrogen or halogen, $n$ and $m$ are 0–2 and the sum of $n$ and $m$ is 0–4.

Examples of these bisphenols are
1,1-bis(4-hydroxyphenyl)-1-phenyl ethane
1,1-bis(4-hydroxyphenyl)-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)pentane
2,2-bis(3,5-difluoro-4-hydroxyphenyl)butane
2,2-bis(3,5-dichloro-4-hydroxyphenyl)propane
2,2-bis(4-hydroxyphenyl)propane
2,2-bis(3,5-dibromo-4-hydroxyphenyl)propane
1,1-bis(3-methyl-4-hydroxyphenyl)ethane
1,1-bis(4-hydroxyphenyl)methane
1,6-bis(4-hydroxyphenyl)cyclohexane
2,2-bis(4-hydroxy-5-methoxyphenyl)propane, and the like.

The polybisphenol resins of this invention have been subjected to fractional gel permeation chromatography (GPC) and the fractions analyzed by nuclear magnetic resonance (NMR) and mass spectographic analysis. The results indicate that the polybisphenol resins are a mixture of resins having the structures set forth in formulas I – V above with about 50 percent by weight of the polymers having formula I, about 40 percent of the polymers having formula II, and about 10 percent of the polymers having formula V, with the remainder being formula IV, dimers of the bisphenol starting compounds, and complex color bodies.

Examples of tertiary amines which may be used to prepare the catalyst are the aliphatic tertiary amines, such as trimethylamine, triethylamine, tripropylamine, tributylamine, trisecondary-propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1-dimethylamine-2-phenylpropane, 1-dimethylamine-4-phenyl pentane, and the like.

Examples of cyclic amines are the pyridines, such as pyridine itself, quinuclidine, the dipyridyls, the N-alkyl pyrroles, the N-alkyl pyrrolidines, the N-alkyl piperadines, the N-alkyl diazoles, the N-alkyl triazoles, the diazines, the triazines, the quinolines, the diquinoyls, the isoquinolines, the N-alkyl tetrahydroquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl) chlorophenyl bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl tetrahydroisoquinoline, N-methyl piperidine, N-methyl pyrrolidine, N-methylimidazole, N-methyl-1,2-4-triazole, N-decylpiperidine, N-decylpyrrolidine, N-isobutylpiperidine, 1-decyl-2-methylpiperidine, N-isopropylpyrrolidine, N-cyclohexylpiperidine, and the like.

Many factors affect the stability of the complex of the tertiary amine and the cuprous salt. These factors are well known in the art and are discussed in detail in such texts as "The Chemistry of the Coordination Compounds" edited by John C. Bailar, Jr., Reinhold Publishing Corp., New York, 1956 and "Mechanisms of Inorganic Reaction," Fred Basolo and Ralph G. Pearson, John Wiley & Sons, Inc., New York, 1959.

Typical examples of tertiary polyamines useful herein are, for example,

N,N,N', N''-tetramethylethylenediamine;
N,ethyl-N,N',N'-trimethylethylenediamine;
N-methyl-N,N',N'-triethylethylenediamine;
N,N,N',N'-tetramethyl-1,3-propanediamine;
N,N,N',N'-tetraethylethylenediamine;
N,N-dimethyl-N',N'-diethylethylenediamine;
1,2-bis(2-methylpiperidino)ethane;
N,N,N',N'-tetra-n-hexylethylenediamine;
N,N,N',N'-tetra-n-amylethylenediamine
1,2-bispiperidinoethane;
N,N,N',N'-tetraisobutylethylenediamine;
N,N,N',N'-tetramethyl-1,3-butanediamine;
1,2-bis(2,6-dimethylpiperidine)ethane;
N,N-didecyl-N',N'-dimethylethylenediamine;
N-methyl-N',N',N'',N''-tetraethylidiethylenetriamine;
N-decyl-N,N',N'-triethylethylenediamine;
2(-β-piperidinoethyl)pyridine;
2-(β-dimethylaminoethyl)-6-methylpyridine;
2-(β-dimethylaminoethyl)pyridine;
2-(β-morpholinoethyl)pyridine;

polyethylenimines having a molecular weight range from about 600 to about 100,000; polyalkylenepolyamines having a molecular weight range from about 1000 to about 100,000; and the like.

In general, tertiary polyamines would behave in the same way as tertiary monoamines except of course, the amount used would only have to be that amount necessary to give the equivalent amount of amino groups.

The oligomers of this invention are characterized as being low melting (20°– 160°C.) solids or semi-solid tars. They are dark (brown, black or reddish-brown), phenolic-smelling minerals; it is thought that the color of the product is due to the presence of minor amounts of chromophores such as quinones. These oligomers have weight average molecular weight of less than 1,500 which means a degree of polymerization of 5 or less. As would be expected, the phenolic OH content and elemental analysis of the oligomers approach that of pure bisphenol A while that of the polymer is much lower:

|  | Aprox. Ranges Oligomers | Polymer | Pure Bisphenol A |
|---|---|---|---|
| % Phenolic OH | 12–14 | 8–12 | 14.9 |
| % C | 75–78 | 71–75 | 78.91 |
| % H | 6–7.5 | 5–7.5 | 7.08 |
| % O | 14–18 | 15–24 | 14.01 |

The polymers have weight average molecular weight greater than 2,000 with a degree of polymerization of more than 7; the melt point of these polymers is above 170°C. The polymers are tan to light brown solid powders with only a slight phenolic odor.

The oligomers are soluble in a variety of common organic solvents (e.g., acetone, tetrahydrofuran, ethylene glycol ethyl ether, diethylene glycol dimethyl ether, isopropanol, dimethylformamide) and in aqueous caustic soda; they are insoluble in toluene, benzene, hexane, methylene chloride, ethyl acetate, water, HCl.

The polymers are soluble in tetrahydrofuran, dimethylformamide, ethylene glycol ethyl ether, and in aqueous caustic soda. They are insoluble in toluene, benzene, hexane, methylene chloride, ethyl acetate, water, HCl, isopropanol, glacial acetic acid, methanol; they are partially soluble in acetone and diethylene glycol dimethyl ether.

Both the oligomer and polymer form long brittle brown fibers from the melt or from solution. The polymers form continuous, hard, clear, brown colored films from solution; these films are brittle but have high gloss and are tack free.

Differential thermal analysis shows no decomposition over the temperature range of 50° – 400°C.

The following examples are presented solely to further illustrate but not limit the invention.

EXAMPLE 1

A one liter 5-necked Pyrex round bottom flask was set up in the hood. The reactor was equipped with paddle stirrer powered by variable speed motor, gas inlet tube, thermometer, heat mantel, dropping funnel, and cold-water condenser with drying tube. The reactor was nitrogen purged for approximately 30 minutes and then charged with 2.0 g. (0.020 moles) CuCl* dissolved in196.5 g. (2.48 moles pyridine. The dark green solution was stirred at about 250 rpm and a solution of Parabis A** (46.0 g. or 201 moles) in pyridine (98.3 g. or 1.24 moles) was added rapidly over a 2-minute period. The pot contents turned to a dark brownish green color upon addition of the bisphenol solution; also, a slight exotherm (<3°C.) was observed. The pot contents were then rapidly heated (19 min.) up to and maintained at reflux (115°C.). Pure oxygen gas (153.1 g. or 4.79 moles) was added rapidly over a 5.0 hour reaction period. The O₂ flowed out of the cylinder through a one micron filter into a gas meter. It then flowed out of the meter through a CaSO₄ drying tube, through a rotometer into a glass inlet tube (approximately 1 mm. opening) and then into the pot contents. The dark brownish green solution (non-viscous) was then cooled in 10 minutes to 31°C. with an external cooling bath; it was then added rapidly to 2 liters of 5N HCl. A hard tan powder precipitated out. After a 30 minute soak period, the powder was vacuum filtered using a coarse, glass frit funnel. The filtrate was an emerald green color, pH 1. The residue was rinsed 3 times with 1N HCl and then washed thoroughly three times with 500 mls. each of deionized water. The residue was air dried 30 minutes and then vacuum dried (18 hrs., 55°C., 25″ Hg, $N_2$ sweep). The dried tan powder weighed 48.5 g. (105.5 percent yield based on Parabis A).

*Prep. by method of Stathis — Chemistry and Industry (London), pg. 633, 5/24/58.
**Parabis A — Dow's tradename for 99 + % p,p′-isopropylidene diphenol.

The polymer softened above 260°C. (limit of Kofler Hot Bench Melt Apparatus) and long brittle fibers were drawn from the soft polymers. Gel Permeation Chromatography (2 percent in tetrahydrofuran) gave the following information from two different samples of the polymer based on a DER 331 (Bis A epoxy resin) calibration curve.

| | Sample 1 | Sample 2 |
|---|---|---|
| Weight avg. molecular weight | 5501 | 6307 |
| Number avg. molecular weight | 1234 | 1381 |
| Viscosity avg. molecular weight | 4574 | 5258 |
| Polydispersity | 4.46 | 4.49 |
| Parabis A residue | 11.7% wt. | 10.6 |
| Polymer species >10,000 m.w. | 17.5% Wt. | 20.5 |
| Degree of polymerization (avg.) | 15.5 | 17.5 |
| Median molecular weight | 3,030 | 3,580 |
| Highest m.w. species present | 38,500 | 26,700 |

The polymer was soluble in: ethylene glycol ethyl ether, dimethylformamide, tetrahydrofuran, 1 N NaOH.

The polymer was partly soluble in: diethylene glycol dimethyl ether, acetone.

The polymer was insoluble in: isopropanol, methylene chloride, hexane, benzene, ethyl acetate, glacial acetic acid, water and methanol.

Films of the polymer cast from tetrahydrofuran solutions were clear, brownish colored, hard and brittle, exhibiting high gloss.

Wet methods analysis gave 72.69% C; 5.82% H; 15.01% O, 9.46% phenolic OH.

EXAMPLES 2–21

In the manner of Example 1, the experiments shown in Table I were conducted and the results tabulated. These are oligomers, low molecular weight polymers, medium molecular weight and high molecular weight resins as is shown in Table II.

A two liter Pyrex round bottom flask was set up in the hood. The reactor was equipped with Teflon paddle stirrer powered by variable speed motor, gas inlet tube, thermometer, heat mantel, temperature controller and cold water condenser with drying tube. The reactor was nitrogen purged for approximately 30 minutes and then charged with 10.0 g. (0.100 moles) CuCl dissolved in 158.2 g. (2.00 moles) pyridine. The dark green solution was stirred at about 250 rpm with $N_2$ purging. A solution of Parabis A (228.3 g. or 1.00 moles) dissolved in 1,000 g. (16.65 moles) isopropyl alcohol was added over a 4 minute period. The pot contents were non-viscous and dark greenish brown in color. The $N_2$ was

TABLE 1

| Examples | Para-bis A | CuCl | Moles Pyridine | $O_2$ | Reaction Time Hrs. | High/Low Range of Reaction Temp., °C. | Yield of Product (g) | % Yield (based on Parabis A) | Product Form | Product Color |
|---|---|---|---|---|---|---|---|---|---|---|
| 2 | 0.201 | 0.020 | 3.72 | 0.18* | 1.0 | 25/23 | 33.0 | 72 | Powder | Brown |
| 3 | 0.201 | 0.020 | 3.72 | 0.12* | 1.6 | 72/24 | 29.4 | 64 | Tar | Brown |
| 4 | 0.201 | 0.020 | 3.72 | 0.04* | 1.0 | 109/108 | 27.9 | 61 | Tar | Brown |
| 5 | 0.201 | 0.020 | 3.72 | 0.14* | 2.0 | 72/70 | 37.8 | 82 | Tar | Brown |
| 6 | 0.201 | 0.020 | 3.72 | 0.07* | 1.0 | 72/70 | 35.7 | 78 | Tar | Brown |
| 7 | 0.201 | 0.020 | 3.72 | 0.36* | 1.0 | 72/70 | 38.7 | 84 | Tar | Brown |
| 8 | 0.201 | 0.020 | 3.72 | 0.98* | 3.0 | 72/70 | 39.5 | 86 | Powder | Brown |
| 9 | 0.201 | 0.050 | 3.72 | 0.40* | 1.0 | 72/70 | 38.7 | 84 | Tar | Brown |
| 10 | 0.201 | 0.020 | 3.72 | 0.40* | 1.0 | 72/70 | 28.3 | 62 | Tar | Brown |
| 11 | 0.201 | 0.020 | 1.86 | 0.39* | 1.0 | 72/70 | 34.6 | 75 | Tar | Brown |
| 12 | 0.201 | 0.020 | 3.72 | 0.37* | 1.0 | 72/70 | 34.6 | 75 | Tar | Brown |
| 13 | 0.201 | 0.020 | 3.72 | 0.45* | 1.0 | 107/98 | 35.7 | 78 | Tar | Brown |
| 14 | 0.201 | 0.020 | 3.72 | 0.83* | 2.0 | 116/105 | 37.0 | 81 | Tar | Brown |
| 15 | 0.201 | 0.020 | 3.72 | 1.86* | 5.0 | 110/106 | 45.0 | 98 | Powder | Brown |
| 16 | 0.201 | 0.020 | 3.72 | 0.90 | 1.0 | 115/113 | 38.0 | 83 | Tar | Brown |
| 17 | 0.201 | 0.020 | 3.72 | 2.49 | 3.0 | 115/110 | 44.0 | 96 | Powder | Tan |
| 18 | 1.00 | 0.050 | 9.32 | 4.18 | 4.0 | 115/113 | 220.0 | 96 | Tar | Black |
| 19 | 1.00 | 0.100 | 9.93 | 1.47 | 2.0 | 115/115 | 229.0 | 100 | Tar | Black |
| 20 | 2.00 | 0.100 | 9.93 | 2.41 | 2.0 | 115/114 | 442.0 | 97 | Tar | Brown |
| 21 | 2.00 | 0.100 | 9.93 | 6.62 | 5.0 | 115/115 | 440.0 | 96 | Tar | Black |
| Control | 0.201 | 0 | 3.72 | 0.33* | 1.0 | 72/70 | 38.0 | 83 | Crystals | White |

*Examples used an industrial grade air (20.9 % $O_2$) instead of pure $O_2$.

TABLE II

| Examples | Avg. Wt. M. W. | Avg. No. M. W. | Avg. Visc. M. W. | Polydispersity | Average D. P. | Median Mol. Wt. | Highest M. W. Species Present | Parabis A Residue | Soft Range °C. | Melt Range °C. | % Phenolic OH |
|---|---|---|---|---|---|---|---|---|---|---|---|
| 2 | 1981 | 854 | 1699 | 2.31 | 5.6 | 1080 | 7900 | 10 | 155 | 155 | |
| 3 | | | | | | | | | 60 | 83/100 | |
| 4 | 542 | 450 | 523 | 1.20 | 1.5 | 385 | 1620 | 55 | 55 | 70/90 | |
| 5 | | | | | | | | | 70 | 90/115 | |
| 6 | 696 | 453 | 607 | 1.53 | 2.0 | 393 | 1750 | 45 | 55 | 78/105 | 13.0 |
| 7 | 634 | 474 | 600 | 1.33 | 1.8 | 392 | 2044 | 44 | 62 | 86/110 | |

TABLE II -Continued

| Examples | Avg. Wt. M. W. | Avg. No. M. W. | Avg. Visc. M. W. | Poly-dispersity | Average D. P. | Median Mol. Wt. | Highest M. W. Species Present | Para-bis A Residue | Soft Range °C. | Melt Range °C. | % Phenolic OH |
|---|---|---|---|---|---|---|---|---|---|---|---|
| 8 | 916 | 555 | 836 | 1.65 | 2.6 | 624 | 3350 | 32 | 75 | 90/115 | |
| 9 | 695 | 503 | 655 | 1.38 | 3.0 | 522 | 2320 | 37 | 58 | 70/110 | |
| 10 | | | | | | | | | 50 | 58/135 | |
| 11 | 2921 | 437 | 1209 | 6.67 | 8.2 | 380 | 1300 | 50 | 50 | 78/108 | |
| 12 | | | | | | | | | 55 | 68/103 | |
| 13 | | | | | | | | | 55 | 70/110 | |
| 14 | 652 | 482 | 617 | 1.35 | 1.8 | 400 | 2044 | 41 | 65 | 78/110 | |
| 15 | 3251 | 1163 | 2843 | 2.79 | 9.2 | 1980 | 12200 | 12 | 170 | 180/220 | |
| 16 | 596 | 464 | 569 | 1.28 | 1.7 | 391 | 1870 | 44 | 58 | 70/100 | |
| 17 | 1246 | 704 | 1142 | 1.76 | 3.5 | 960 | 4750 | 23 | 110 | 125/155 | |
| 18 | | | | | | | | | 50 | 70/110 | |
| 19 | | | | | | | | | 25 | 50/60 | |
| 20 | 729 | 454 | 622 | 1.60 | 2.1 | 388 | 1870 | 45 | 25 | 50/60 | 12.0 |
| 21 | 911 | 489 | 756 | 1.86 | 2.6 | 400 | 2320 | 40 | 50 | 70/80 | 12.8 |
| Control | 355 | 354 | 355 | 1.00 | 1.0 | 351 | 378 | 100 | 157 | 158/160 | | turned off and the pot contents heated rapidly (24 minutes) up to and then maintained at reflux (85°C.). The pot contents turned to a light green color at 80°C. Oxygen gas (172.0 g. or 5.375 moles) was added uniformly over a 5.0 hour reaction period. The pot contents turned a very dark brown color but remained non-viscous. The oxygen was then turned off and the reactor contents cooled (over a 20 minute period) to 30°C. with an external cool water bath. At about 70°C. a fine, dark solid began to precipitate slowly. At 30°C. the solid was in high concentration and probably could have been filtered advantageously (i.e., the polymer could be isolated from its oligomers, Bis A monomer, catalyst and solvent). However, the pot contents were poured rapidly into 4 liters of about 5 N hydrochloric acid with hand stirring. A tan hydrophobic powder precipitated and was stirred in the pH 1 system overnight. The polymer was vacuum filtered using a coarse glass frit funnel; the filtrate was an emerald green color and the hydrophobic powder was straw colored no filter plugging occurred. After several washings with 1 N hydrochloric acid and then with water, the polymer was air-dried for about 4 hours on the funnel. The polymer was then dried in a vacuum oven for 24 hours at 45°C., 25" Hg with a slight $N_2$ bleed. The dried powder weighed 223 g. (97.8 percent yield based on Parabis A). The powder softened on the Kofler Hotbench at 220°C. and long brittle fibers could be drawn from it. No melting or decomposition was observed at 260°C. (temperature limit of equipment). However, the powder turned dark brown and became acetone-insoluble after heating at 260°C. for 5 minutes. The powder was still soluble in acetone after 5 minutes heating at 175°C. with no change in color observed.

Gel permeation chromatography (2 percent in tetrahydrofuran) gave the following information based on D.E.R. 331 (Bis A epoxy resin) calibration curve:

| | |
|---|---|
| Wt. avg. Molecular Weight | 4545 |
| No. avg. Molecular Weight | 1127 |
| Viscosity avg. Molecular Wt. | 3755 |
| Polydispersity | 4.034 |
| Polymer Species > 10,000 m.w. | 13.4% |
| Degree of Polymerization (avg.) | 12.8 |
| Median Molecular Weight | 2172 |
| Highest m.w. Species Present | 23,300 |
| Bisphenol A Residue | 11.7% |

The polymer was soluble in acetone, tetrahydrofuran and 1 N NaOH. It was insoluble in hexane, benzene, water and methanol.

EXAMPLES 23–25

In the manner of Example 1 (except that isopropanol) was used as the Bisphenol A solvent instead of pyridine), the experiments shown in Table III were conducted and the results tabulated in Table IV. These are examples of oligomers, low, medium, high molecular weight polymers.

TABLE III

| Example | Para-bis A | CuCl | Moles Pyridine | Iso-propanol | $O_2$ | Reaction Time Hrs. | High/Low Range of Reaction Temp. °C. | Product Form | Product Color |
|---|---|---|---|---|---|---|---|---|---|
| 23 | 0.201 | 0.020 | 1.00 | 5.55 | 4.50 | 3.0 | 87/86 | Powder | Tan |
| 24 | 1.000 | 0.101 | 2.00 | 16.65 | <5 | 5.0 | 86/85 | Tar | Black |
| 25 | 1.000 | 0.101 | 2.00 | 16.65 | 7.34 | 5.0 | 86/83 | Powder | Tan |

TABLE IV

| Example | Average Wt.M.W. | Average No. M.W. | Avg. Visc. M.W. | Poly-dispersity | Polymer Species >10,000 M.W.(%) | Average Degree of Polymerization | Highest M.W. Species Present | % Bis A Residue | Median M. W. |
|---|---|---|---|---|---|---|---|---|---|
| 23 | 2435 | 943 | 2111 | 2.583 | 0 | 6.9 | 9100 | 15.1 | 1360 |
| 24 | 1725 | 720 | 1499 | 2.394 | 0 | 4.9 | 7900 | 25.2 | 1016 |
| 25 | 6592 | 1215 | 5229 | 5.424 | 21.2 | 18.6 | 36000 | 10.3 | 26.10 |

I claim:
1. Polybisphenols having recurring units of the following structure,

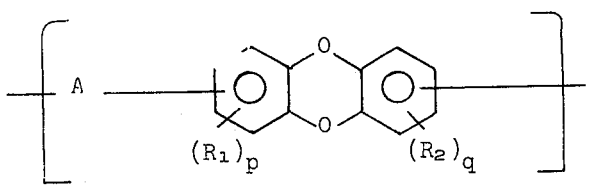

wherein A is a divalent hydrocarbon group of 1–13 carbons, $R_1$ and $R_2$ are independently selected from hydrogen, halogen, alkoxy, or alkyl groups wherein the alkoxy or alkyl groups have 1–3 carbon atoms, $p$ and $q$ are 0 – 2 and the sum of $p$ and $q$ is 0 – 4, prepared by the oxidative coupling of bisphenols with an oxygen containing gas.

2. Oligomeric polybisphenols according to claim 1.
3. Fiber forming polybisphenols according to claim 1.
4. Thermoplastic polybisphenols produced by reacting a bisphenol having the structure

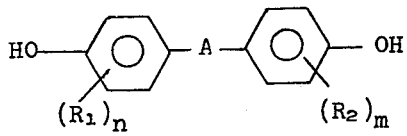

wherein A is a divalent hydrocarbon group of 1–13 carbons, $R_1$ and $R_2$ are independently selected from hydrogen, halogen, alkoxy, or alkyl groups having 1–3 carbon atoms in the alkoxy or alkyl groups wherein one or two of the positions ortho to the hydroxy group are substituted by hydrogen or halogen, $n$ and $m$ are 0–2 and the sum of $n$ and $m$ is 0–4, with an oxygen containing gas in the presence of a cuprous salt and a tertiary amine.

5. Thermoplastic polybisphenols produced as set forth in claim 4 wherein the oxygen containing gas used is sufficient to give an oxygen-bisphenol mol range of about 0.1:1 to about 50:1, wherein the amount of cuprous salt used is sufficient to give a cuprous salt-bisphenol mol range of about 0.1:1 to about 1.0:1 and wherein the amount of tertiary amine used is sufficient to give an amine-bisphenol mol range of about 0.5:1 to about 50:1.

6. Thermoplastic polybisphenols as set forth in claim 4 wherein the bisphenol used is 2,2-bis(4-hydroxyphenyl)propane.

7. Thermoplastic polybisphenols as set forth in claim 5 wherein the bisphenol used is 2,2-bis(4-hydroxyphenyl)propane.

8. Polybisphenols having a majority of recurring units of the following structures,

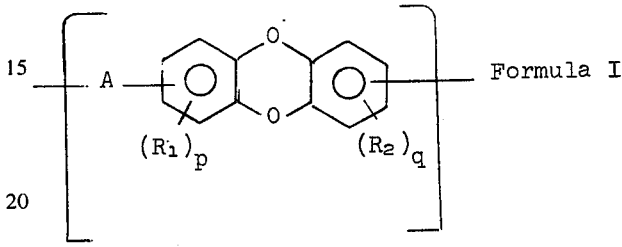 Formula I

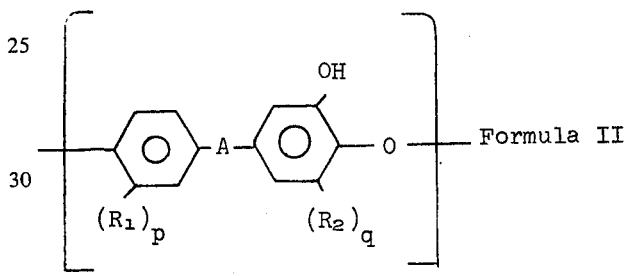 Formula II wherein A is a divalent hydrocarbon group of 1–13 carbons, $R_1$ and $R_2$ are independently selected from hydrogen, halogen, alkoxy, or alkyl groups wherein the alkoxy or alkyl groups have 1–3 carbon atoms, $p$ and $q$ are 0–2 and the sum of $p$ and $q$ is 0–4, prepared by the oxidative coupling of bisphenols with an oxygen containing gas.

9. Oligomeric polybisphenols according to claim 8.
10. Fiber forming polybisphenols according to claim 8.

* * * * *